United States Patent [19]
Campbell et al.

[11] Patent Number: 5,555,435
[45] Date of Patent: Sep. 10, 1996

[54] AUTOMATIC LANGUAGE BOUNDARY IDENTIFICATION FOR A PERIPHERAL UNIT THAT SUPPORTS MULTIPLE CONTROL LANGUAGES

[75] Inventors: Russ Campbell; Daniel L. George; Thomas T. Pearse; Michael E. Sloane, all of Boise, Id.

[73] Assignee: Hewlett-Packard Company, Palo Alto, Calif.

[21] Appl. No.: 309,515

[22] Filed: Sep. 20, 1994

Related U.S. Application Data

[63] Continuation of Ser. No. 939,785, Sep. 3, 1992, abandoned.

[51] Int. Cl.$^6$ ............................ G06F 15/00; G06K 15/00
[52] U.S. Cl. ..................... 395/800; 395/112; 395/114; 395/116
[58] Field of Search .................................. 395/800, 112, 395/114, 116, 500, 109

[56] References Cited

U.S. PATENT DOCUMENTS

| | | | |
|---|---|---|---|
| 3,810,109 | 5/1974 | Morris et al. | 340/172.5 |
| 4,965,771 | 10/1990 | Morikawa et al. | 395/112 |
| 4,968,159 | 11/1990 | Sasaki et al. | 400/76 |
| 4,992,957 | 2/1991 | Aoyama et al. | 364/519 |
| 5,075,874 | 12/1991 | Steeves et al. | 395/112 |
| 5,084,831 | 1/1992 | Morikawa et al. | 395/116 |
| 5,165,014 | 11/1992 | Vassar | 395/112 |
| 5,222,200 | 6/1993 | Callister et al. | 395/112 |
| 5,226,112 | 7/1993 | Mensing et al. | 395/114 |
| 5,293,466 | 3/1994 | Bringmann | 395/114 |
| 5,303,336 | 4/1994 | Kageyama et al. | 395/114 |
| 5,321,770 | 6/1994 | Huttenlocher et al. | 382/22 |
| 5,333,246 | 7/1994 | Nagasaka | 395/133 |
| 5,392,419 | 2/1995 | Walton | 395/500 |
| 5,402,528 | 3/1995 | Christopher et al. | 395/109 |

FOREIGN PATENT DOCUMENTS

0469974A2  5/1992  European Pat. Off. .

OTHER PUBLICATIONS

Gordon L. Hanson et al., "Microprocessor Performance Issues in Non–Impact Printer Applications", 1990, pp. 320–323.

*Primary Examiner*—Alyssa H. Bowler
*Assistant Examiner*—John Follansbel

[57] ABSTRACT

A peripheral unit is able to receive a plurality of control languages, check for an occurrence of a control language job boundary, and to function in response to each control language. For PCL the steps that determine when to check for occurrence of a control language job boundary are: identify the next command from the input data stream; determine if the identified command is not a PCL control character or calls for a mark to be made on the page, and if the page has not been previously marked. If the above criteria is met, the command and following data are examined to determine if a job boundary has occurred. Thus at the commencement of every formatted PCL page of data, a decision is made whether a job boundary has occurred. For PostScript the steps are: prescan the data stream. If a next command is an end-of-job marker then exit PostScript and return to identify the language of the input data. If the next command is an escape character and the current I/O protocol is not binary, the command and following data are examined to determine if a job boundary has occurred. A job boundary is determined by examining the input data sample and determining if its syntax is characteristic of a current job's control language or a different control language. If the syntax of the input data sample is different than the syntax of the current control language than a job boundary has occurred.

16 Claims, 3 Drawing Sheets

AUTOMATIC LANGUAGE BOUNDARY IDENTIFICATION FOR A PERIPHERAL UNIT THAT SUPPORTS MULTIPLE CONTROL LANGUAGES

CROSS REFERENCE TO RELATED APPLICATION

This is a continuation of application Ser. No. 07/939,785 filed on Sep. 03, 1992, now abandoned.

FIELD OF THE INVENTION

This invention relates to peripheral units that support multiple control languages and more particularly, to a method and apparatus for identifying boundaries between jobs that employ different control languages.

BACKGROUND OF THE INVENTION

Modern data processing networks enable various types of computers to interconnect with a communications network. Peripheral units, such as printers, plotters, etc., are also connected to the communications network and serve as resources for the connected computers. Those peripherals must be able to understand and respond to commands received from the various computers. So long as all connected computers employ the same peripheral control language, a peripheral unit needs to recognize and respond to only that language. When, however, computers employ different peripheral control languages, the peripheral unit must be designed so that it can recognize and respond to the different incoming languages.

In U.S. patent application Ser. No.: 07/825,479, entitled "Language Identification System and Method For a Peripheral Unit" to Sean E. Walton, a system is described that enables a peripheral unit to identify a control language by both syntactical and contextual analyses of an incoming data block. The system includes a voter module for each expected language, each voter module providing to a "decider" module, a vote for or against its specific language. The decider module, upon analysis of inputs from each voter module causes the peripheral to enable one of its control language programs in accordance with the voter module inputs or, in the event no language is discerned, causes the peripheral to cease operation. In order for the aforementioned syntax and contextual analysis system to operate reliably, boundaries between jobs that employ different control languages must be identified reliably.

One method currently employed by peripherals that support multiple control languages is to use an approach called "time-out" job separation. The procedure requires a fixed time to expire between jobs before the peripheral unit can enter a state where it is enabled to determine a next language. If the next job appears before the time out has expired, the peripheral unit assumes that there has been no language change and misprints can occur that produce hundreds of pages of illegible text.

In many systems that employ multiple peripheral control languages, a buffering device is placed between the communications network and the peripheral unit to provide auxiliary storage for jobs being inputted into the peripheral unit. Such buffering devices often do not support the time-out job separation procedure. Thus, the peripheral unit can receive a plurality of jobs in sequence from the buffering device with little or no time-out separation.

Two commonly used printer control languages are PCL and PostScript. PostScript language jobs usually employ an end-of-job marker which, when used, simplifies the delineation of multiple print jobs. By contrast, PCL jobs often do not employ an end-of-job marker. In either case, when a change of control language occurs between a current job and a succeeding job, if the end of the current job is not properly marked, the succeeding job's control language may not be enabled.

Accordingly, it is the object of this invention to provide an improved method and system for a peripheral unit to determine when to sample an input data stream to check for the occurrence of a control language job boundary.

It is another object of the invention to provide an improved language boundary identification procedure which will determine if input data represents a current control language or a new control language.

It is yet another object of this invention to provide an improved language boundary identification procedure for a peripheral control language that does not employ an end-of-job marker.

SUMMARY OF THE INVENTION

A peripheral unit is able to receive a plurality of control languages in an input data stream and to function in response to each control language. The peripheral unit determines when to check for an occurrence of a control language job boundary.

For PCL, the steps that determine when to check for occurrence of a control language job boundary are: identify the next command from the input data stream; determine if the identified command is not a PCL control character or calls for a mark to be made on the page, and if the page has not been previously marked. If the above criteria are met, the command and following data are examined to determine if a job boundary has occurred. Thus at the commencement of every formatted PCL page of data, a decision is made whether a job boundary has occurred.

For PostScript, the steps that determine when to check for the occurrence of a control language job boundary are: prescan the data stream. If a next command is an end-of-job marker then exit PostScript and return to identify the language of the input data. If the next command is an escape character and the current I/O protocol is not binary, the command and following data are examined to determine if a job boundary has occurred.

A job boundary is determined by examining the input data sample and determining if its syntax is characteristic of a current job's control language or a different control language. If the syntax of the input data sample is different than the syntax of the current control language than a job boundary has occurred.

DETAILED DESCRIPTION OF THE INVENTION

Figure 1:
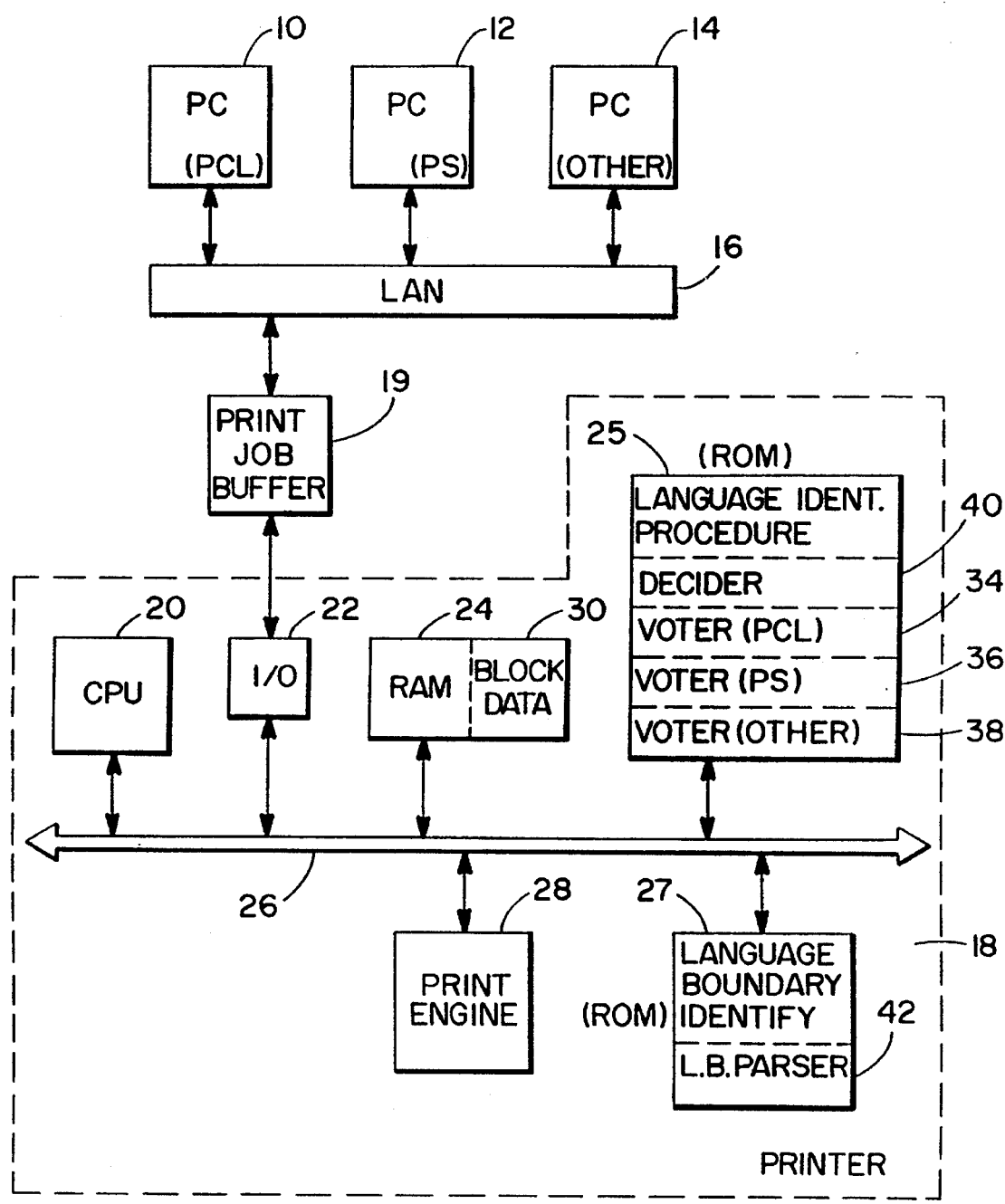
FIG. 1 is a block diagram of a system that embodies the language boundary identification procedure of the invention.

Referring now to FIG. 1, personal computers 10, 12 and 14 are each interconnected via a local area network (LAN)

16 or another equivalent communications network. A printer 18 is connected via a print job buffer device 19 to LAN 16. It is to be noted that some print job buffer devices include internal communication functions and these may remove the need for a LAN 16.

Printer 18 provides print services for each of personal computers 10, 12 and 14. Hereafter, the invention will be described in the context of printer 18, however, it is to be understood that other peripheral units that perform services for connected computers can also utilize the same invention. Examples of other such peripheral units are plotters, facsimile units, etc.

Computers 10, 12 and 14 can each employ different printer control languages. Likewise, any one computer may employ more than one printer control language. To illustrate the invention, it will be assumed that PC 10 employs the printer control language known as PCL and PC 12 employs the PostScript printer control language. PC 14 is assumed to employ another printer control language.

When one of PC's 10, 12 and 14 transmits a print job, that print job is communicated via LAN 16 to print job buffer device 19. There, print jobs are queued and are serially fed to printer 18.

Printer 18 includes a central processing unit 20, an input/output (I/O) module 22, a random access memory (RAM) module 24 and read only memory (ROM) modules 25 and 27. ROM modules 25 and 27 can, of course, be configured as a single ROM. Each of those units/modules is interconnected via a bus 26 to a print engine 28. ROM module 25 includes a program that is utilized for a language identification procedure and ROM 27 includes a program for language boundary identification. Contained in a region of RAM 24 designated as 30 is an area for storing a block of data received from one of PC's 10, 12 or 14. The firmware in ROM 25 embodies the language identification procedure for printer 18 and comprises a plurality of voter modules 34, 36 and 38, each of which is specifically assigned to the analysis and interpretation of an expected printer language. A decider module 40 receives outputs from each of voter modules 34, 36 and 38 and decides, based upon those voter module inputs which is the most likely identity of the control language of the data stored in RAM area 30. Decider module 40 then instructs CPU 20 to access the syntactical decoding software that will enable it to interpret and execute the decided-upon language. The operation of the language identification procedure and the various voter and decider modules is described in detail in the above-noted co-pending application of Walton, which application is incorporated herein by reference.

In order for the language identification procedure to operate properly, each job boundary must be precisely identified. Since PostScript jobs typically employ an end-of-job marker, such identification is usually straight-forward. By contrast, PCL jobs do not employ an end-of-job marker so identifying an end-of-job and a switch to another control language (i.e. PostScript) is non-trivial. This invention makes use of the fact that PostScript employs groups of ASCII characters to embody its commands (as well as data). A PostScript parser will recognize and interpret defined ASCII groups as commands, however, a PCL parser will recognize and interpret each ASCII character as a command to mark a page in accordance with the particular represented character. Thus, if a printer is under control of a PCL parser, it will respond to the first character of a PostScript command by marking a page, unless the command is one which is recognized as not requiring a page mark. Additionally, this invention makes use of the fact that PCL uses an Escape character (ASCII 27) to commence many commands and that the presence of the Escape character in a non-binary PostScript data stream is highly unlikely. Thus, a sensed Escape character is likely to be the beginning of a PCL job. In this case it is assumed that the PostScript job was "malformed" because it did not end with the appropriate end-of-job marker.

The language boundary identification procedure in ROM 27 enables (1) the identification of a job boundary between PCL and a subsequent job employing a different control language and (2) the identification of a job boundary between PostScript and a subsequent job employing a different control language. The procedure employed by the language boundary identification procedure (in combination with CPU 20) is shown in the flow diagram of FIG. 2). A language boundary (LB) parser 42 is contained within ROM 27 and aids in the boundary identification procedure (to be explained in detail below).

Figure 2:
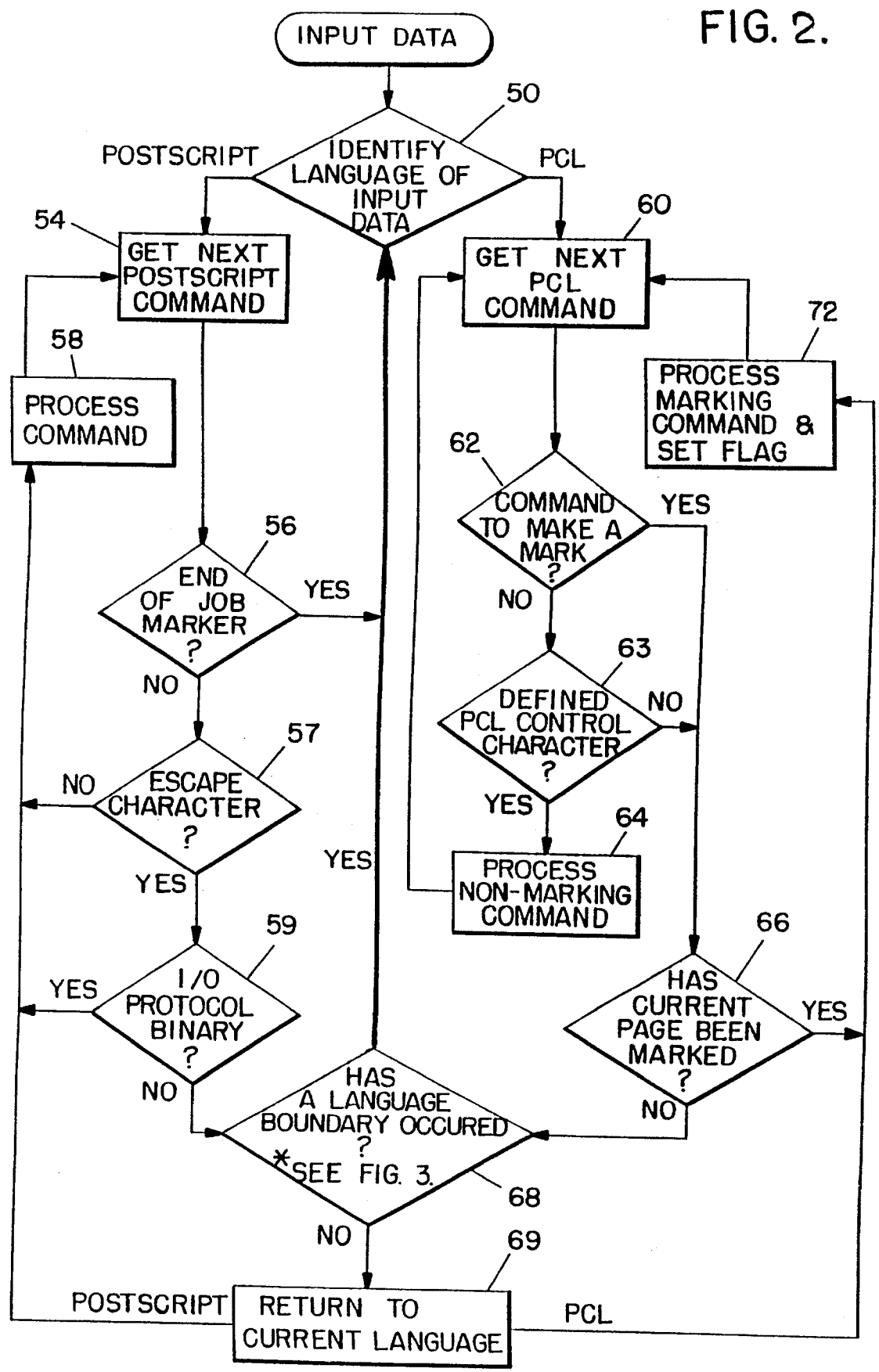
FIG. 2 is a high level flow diagram of the language boundary identification procedure formed by the system of FIG. 1.

In FIG. 2, initially, the language identification procedure shown in printer 18 (FIG. 1) identifies the language of an input data stream that is currently being processed (decision box 50). If the identified language is PostScript, the procedure iterates down the left side of FIG. 2. By contrast, if the currently identified language is PCL, the system iterates down the right side of FIG. 2. Assuming that the identified language is PostScript, the procedure accesses a next command (box 54). It will be remembered that Escape characters in a non-binary PostScript job are highly unlikely. If the next command indicates an end-of-job marker (box 56), then the present job is terminated and the procedure cycles back to box 50 to identify the language of the new job. If the command is not an end-of-job marker, then the command is next tested to see if it is an Escape character (ASCII 27) (decision box 57). If the command is an Escape character and the current I/O protocol is not binary (box 59), then decision box 68 is called to determine if a control language boundary has occurred.

If decision box 50 indicates that the currently identified language is PCL, the procedure iterates to obtain a next command (box 60). It will be remembered that PCL recognizes ASCII representations of characters as commands to print those characters. Therefore, the obtained command is analyzed syntactically to determine if it is one of the group of PCL commands which indicate that a mark is to be made on a page (decision box 62). If no, the command is further analyzed to determine if it matches one of a predefined set of PCL control characters that do not mark a page—but do provide a high confidence indication that the language continues to be PCL. Those commands have ASCII decimal values of 0, 7–15 and 27 (i.e., an "Escape" character). If such a command is found (decision box 63), the thus determined PCL nonmarking command is then processed (box 64) and the procedure iterates to obtain a next command.

If, the command is recognized (decision box 62) as requiring a page to be marked (e.g., an ASCII character), or if the analysis procedure indicated in decision box 63 indicates the command not to be a defined PCL control character, then the procedure iterates to determine whether the current page has been previously marked (decision box 66). If no, it is assumed that a possible job boundary has been reached. As soon as a mark has been placed on the page a marking flag is set that will hereafter be examined to determine if a page has been marked. This flag will remain set until the current page is completed and printed, at which time the marking flag is reset.

Decision box 68 determines if a job boundary has occurred by analyzing the data sample to determine if the commands and syntax are representative of "keys" in the "current" control language or a "new" control language. A "key" is a character or series of characters as defined within a control language's command rules. The procedure in box 68 continues to identify keys from the data sample and accumulates current language and new language weights until either an end of data sample occurs or a predetermined current language or new language key-weight threshold is exceeded. If the end of data sample occurs before the current-language or new-language key-weight threshold is exceeded then no job boundary has occurred. If the current language key-weight threshold is exceeded, then no job boundary occurred. If the new language key-weight threshold is exceeded, then a job boundary has occurred. If the analysis in box 68 indicates a job boundary has occurred then box 50 is called to identify the language of the input data, to enable the new language and the new job is then commenced employing the enabled language.

From the above it can be seen that the procedure enables a practical mechanism of looking at a point in the data stream for a job boundary, and performing a brief analysis of the data at that point to determine if the control language is the same as the current control language or a new control language.

Figure 3:
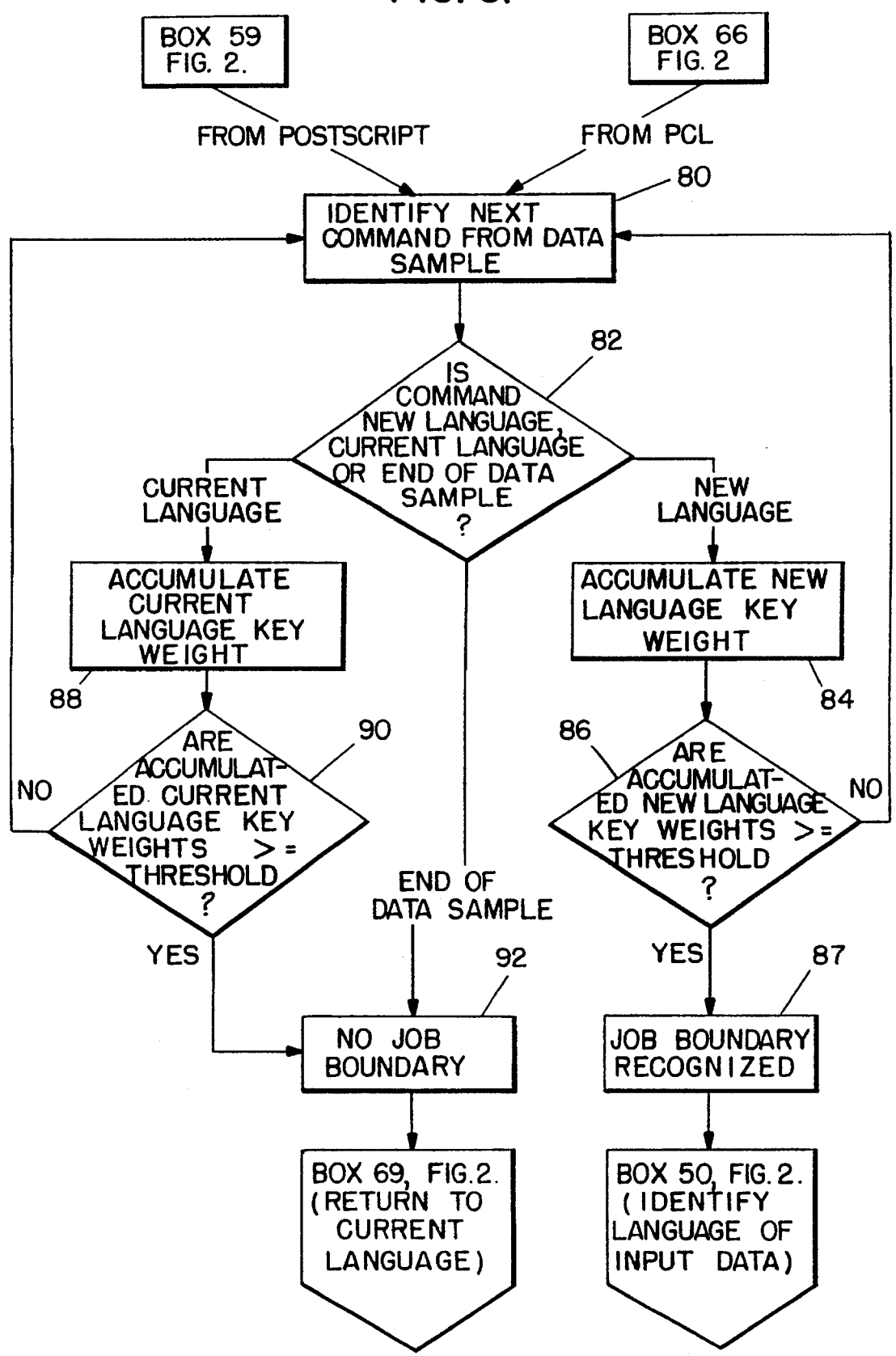
FIG. 3 is a flow diagram of a syntax analysis procedure employed with the procedure shown in FIG. 2.

Turning now to FIG. 3, a brief logic flow diagram indicates operations that are performed by the software indicated in decision box 68 in FIG. 2. The functions to be hereinafter identified are carried out by LB parser 42 in ROM 27 (FIG. 1). LB parser 42 reads data from a data sample at the beginning of the input data stream. LB parser 42 recognizes a series of keys, each of which is counted as the data sample is analyzed. The occurrence of each key causes an increment to be added to an accumulator for that particular key. After each key is received, and its respective accumulator is incremented, the procedure evaluates the accumulator values to determine if the data sample is PostScript or PCL. LB parser 42 continues to parse the incoming data until either a definite decision can be made in favor of PostScript or PCL, or until the end of the input sample is reached. If at any time it is determined that a definite decision can be made, further analysis is terminated.

Each specific key is assigned a weight value so that when it is detected, its respective accumulator is incremented by the amount of the weight assigned to the key type. Thus, certain keys will have a greater effect on the accumulator value than others, with the former keys being more indicative of the presence of the language than the latter keys. The keys which are recognized by LB parser 42, and are used to discriminate between PCL and PostScript are listed below. The keys are separated into PCL and PostScript discriminators. Unless otherwise noted, key weights are counted for each occurrence of a key.

PostScript Keys:
  Special Job Beginning Control Characters.
    The occurrence of one of the following control character sequences is counted once at the very beginning of the data sample: ^A,^C,^D,^S,^Q,^T
  Post Script Header Comments.
    The text strings or sub strings "%!PS", "%!", or "EPSF" on the same line as the substring "%!PS"
  Asynchronous Control Characters are counted and stripped before evaluating the rest of the data sample: ^T,^C.
  PostScript Unique Keywords.
    Predefined PostScript operators that are typically not found outside the PostScript language.
  Empirical PostScript Keywords.
    Known non-English words that PostScript applications use but are not a part of the PostScript language.
  PostScript Documentation Keywords.
    Words defined by Adobe as PostScript documentation keywords. These words are only counted when they occur as the first word in a PostScript comment.
  PostScript Comments.
    Text beginning with "%" and continuing through the end of line. Evaluation of a comment is terminated early if an Escape of Form Feed character is encountered.
  PostScript Neutral Keywords. Predefined PostScript operators that have meaning outside of the PostScript language and may be found in normal English.
PCL Keys:
  Escape Character
    A character with an ASCII value of 27 which is used at the beginning of PCL escape sequence command.
  Form Feed Character.
    A character with an ASCII value of 12 which causes the currently formatted PCL page to print.
  Unknown Words.
    Text strings which do not match predefined PostScript keys.

Any of the special job beginning control characters listed above strongly indicate the beginning of a PostScript job, if the special control character is the first character read. Thus, this key is only counted once by LB parser 42, but is weighted heavily if found at the outset of data flow. Neutral keywords, by contrast, are weighted much less heavily since they can indicate not only PostScript but other languages as well. A threshold may be empirically determined so that when the sum of the accumulated keyword value weights exceeds a limit, a decision is made that the PostScript language has been determined. LB parser 42 is also enabled to foreshorten the analysis procedure and reject a tentative language choice if it encounters a particular character that is clearly indicative of a language other than the tentative choice. The analysis carried out by LB parser 42 does not take into account contextual relationships of keys—which is also important to language identification. Thus, the decision reached may still be subject to reversal should the more detailed language identification procedure described in the copending application to Walton indicate that a mistake has been made. Nevertheless, the above noted analysis is sufficient to indicate a high probability of a job language boundary.

The above noted procedure is illustrated in FIG. 3 wherein box 80 illustrates the key identification procedure carried out by LB parser 42 to determine if a data sample represents the current control language or a different control language. This is done by accumulating key weights for recognized keys in the data sample until a language determination can be made or the end of the data sample is reached. In the case where the end of data sample is reached and no language determination has been made, then no job boundary has occurred.

This procedure iterates through the data sample as follows: If the next identified command (box 80) in the data sample matches a current language key (decision box 82) then the key weight for that key is accumulated into the current language total key weight (box 88). If the next identified command in the data sample matches a new language key (decision box 82), then the key weight for that key is accumulated into the new language total key weight (box 84). If the total current language key weight sum is equal To or greater than a predetermined threshold (decision box 90), then no job boundary has occurred (box 92) and processing continues in the current control language. If the total new language key weight sum is equal to or greater than a predetermined threshold (decision box 86), then a job boundary has occurred (box 87) and the procedure exits to box 50 in FIG. 2 to identify the new control language of the input data sample.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. In a peripheral unit for creating marked pages, said peripheral unit adapted to receive, interpret and respond to a plurality of control languages that may appear in an input data stream, a method for identifying occurrence of a language boundary between a first control language and a second control language, said language boundary indicating a cessation of commands configured in accord with said first control language and a commencement of commands configured in accord with said second control language, comprising the steps of:
   (a) determining if a command in said data stream requires a printing of an initial mark on a page and, if yes;
   (b) instituting a subroutine to further determine if a language boundary has been encountered; and
   (c) if yes, identifying a control language of the input data stream.

2. The method as recited in claim 1, including after step (a) the further steps of:
   (a1) if step (a) indicates no, interpreting said command to determine if it is one of a predefined set of control characters in said first control language and, if yes, processing said command using first control language interpretation means.

3. The method as recited in claim 2, wherein if step (a1) indicates no, proceeding to step (b).

4. The method as recited in claim 1 wherein said peripheral unit is initially interpreting said second control language instead of said first control language, said method comprising the added steps of:
   determining whether a next command is an end of job marker;
   If yes, identifying a control language from the input data;
   If no, determining whether a next character is an escape character;
      if no, processing a next command;
      if yes, determining whether said peripheral unit is in a binary input/output mode;
         if yes, processing a next command;
         if no, determining if a language boundary has occurred.

5. The method as recited in claim 4 wherein said first control language is PCL.

6. The method as recited in claim 4 wherein said second control language configures its commands in a code which is recognized by said first control language as defining characters to be imprinted on a page.

7. The method as recited in claim 6 wherein said second control language is PostScript.

8. The method as recited in claim 4 wherein said language boundary determining step further comprises:
   parsing said data stream so as to identify keys for said control languages; and
   indicating the presence or absence of a language boundary when sufficient key values from a control language are accumulated to equal a key value threshold.

9. The method as recited in claim 8 wherein each identified key is assigned a weight and said weights are summed to determine if said key value threshold has been reached.

10. The method as recited in claim 9 wherein if said summed weights of key values indicate that a currently in-use control language is present, then no language boundary is indicated.

11. The method as recited in claim 9 wherein if said summed weights of key values indicates that new control language is present, then a language boundary is indicated.

12. In a peripheral unit for creating marked pages, said peripheral unit adapted to receive, interpret and respond to a plurality of control languages that may appear in an input data stream, a system for identifying occurrence of a language boundary between a first control language and a second control language, said language boundary indicating a cessation of commands configured in accord with said first control language and a commencement of commands configured in accord with said second control language, the peripheral unit comprising:
   first means for determining if a newly received command in said data stream requires a printing of an initial mark on a page; and
   parse means responsive to a determination from said first means that said newly received command requires a printing of said initial mark on said page, for determining if said newly received command and a portion of said input data stream are indicative of a language boundary.

13. The unit as recited in claim 12 wherein said peripheral unit is initially interpreting said second control language instead of said first control language, said unit comprising:
   means responsive to a next command not being an end of job marker, but being an escape character, and further responsive to the peripheral unit operating in other than a binary mode of communication, to pass said command and following data to said parse means for determining whether a language boundary has been encountered.

14. The unit as recited in claim 13 wherein said parser means identifies language keys for said first and second control languages and assigns each identified key a weight, said weights being summed for each control language to determine if a predetermined key threshold has been reached, said key threshold indicating the occurrence of a said language.

15. The system as recited in claim 14 wherein said first control language is PCL.

16. The system as recited in claim 14 wherein said second control language is PostScript.

* * * * *